UNITED STATES PATENT OFFICE.

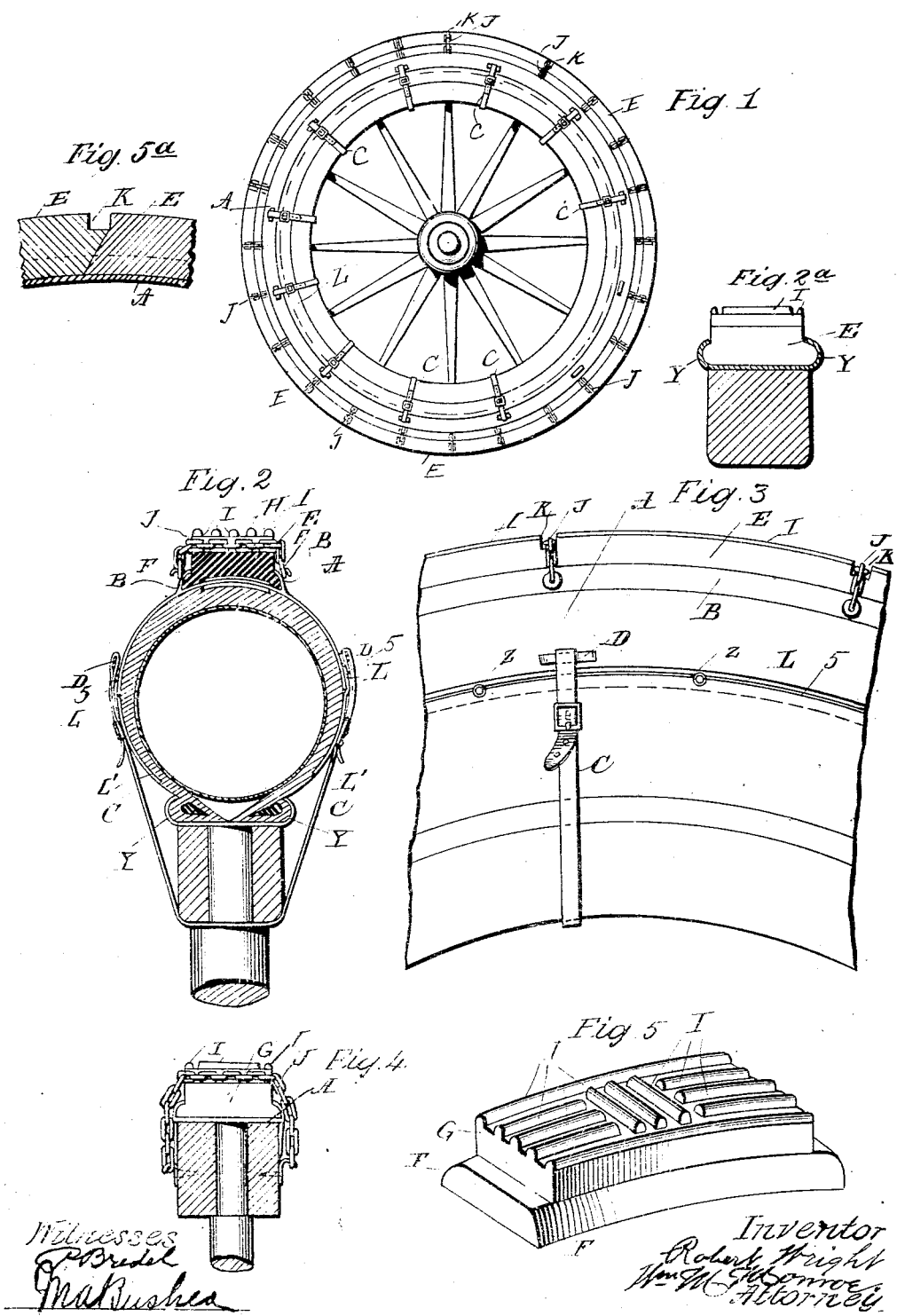

ROBERT WRIGHT, OF CLEVELAND, OHIO.

CONVERTIBLE TIRE.

1,105,121.  Specification of Letters Patent.  Patented July 28, 1914.

Application filed January 27, 1911. Serial No. 605,031.

*To all whom it may concern:*

Be it known that I, ROBERT WRIGHT, a citizen of the United States, and resident of Cleveland, in the county of Cuyahoga and State of Ohio, have invented certain new and useful Improvements in Convertible Tires, of which I hereby declare the following to be a full, clear, and exact description, such as will enable others skilled in the art to which it appertains to make and use the same.

The objects of the invention are to provide a solid rubber tire and metal rim therefor, suitable for attachment to an automobile wheel and attachable to the exterior of a pneumatic tire and adapted to serve as a protective tread and armor therefor, and also attachable to a wood or metal wheel as a complete tire and metal rim therefor.

The invention comprises also sectional hard rubber tire portions, provided with marginal extensions at their lower edges, adapted for insertion in clencher edges in the metal rim, adapted also in case of injury to a pneumatic tire, for insertion in the ordinary clencher rim of the pneumatic tire, in lieu of the injured tire.

The invention further includes the combination and arrangement of parts and the construction of the various details as hereinafter described, shown in the accompanying drawings and specifically pointed out in the claim.

In the accompanying drawings Figure 1 is a side elevation of an automobile wheel showing a pneumatic tire, a metal protecting rim and a solid rubber tread therefor; Fig. 2 is an enlarged transverse section thereof; Fig. 2ª is a transverse section showing the outer tire secured in the wheel rim; Fig. 3 is an enlarged side elevation of a portion thereof; Fig. 4 is a transverse section showing the metal rim attached to a wooden felly; Fig. 5 is a perspective view of a solid rubber block forming a portion of the tread surface and attachable to the metal rim; Fig. 5ª is a longitudinal section showing overlapping extremities for solid rubber tread sections.

In these views A is a metal rim which can be made in semitubular form as shown in Figs. 2 and 3 to accommodate it to the curved tread surface of a pneumatic tire and it may extend as far as desired upon the sides of the tire to prevent injury thereto. The rim is preferably provided with transverse ridges B' at intervals to prevent slipping upon the tire.

The metal rim may be attached to the tire in any suitable manner as by straps C which pass through loops D upon the metal sides.

Mounted in clencher edges B, B upon the metal rim is shown a solid rubber tire E. This may comprise a continuous rubber ring with clencher edges F, F adapted to enter the clencher edges D, D in the rim, or may consist of a series of solid rubber blocks G, G having clencher edges F, F. To prevent slipping on the rim transverse ridges H, H on the outer face of the rim are employed which enter the rubber blocks and retain them in place.

Additional frictional contact is provided for the tread surface of the tire and blocks by the addition thereto of small integral ridges I, I arranged in both transverse and longitudinal rows or in any desired pattern, to prevent " skidding " of the wheel.

Chains J, J may be passed around the solid rubber tire, and around the blocks to form a gripping means to increase traction where desired, and are detachably secured to hooks or other fastening means on the sides of the metal rim. These chains preferably pass through grooves K, K which may be formed between the sections, so that the chains lie slightly below the surface of the blocks and hence the greater the pressure the greater the traction of the wheel will be.

To protect the opening between the edges of the metal rim and the pneumatic tire an apron L is passed over the opening and is secured to or is integral with the pneumatic tire near the rim sides at L'.

Any suitable fastening devices for the edges of the apron can be employed as screws or pins Z on the rim and nuts or other clamping means to hold the apron edges tightly down upon the rim.

In Fig. 2ª the clencher edges upon the solid tire are shown sufficiently large for insertion in the clencher edges Y of the pneumatic tire rim. This proportion of parts greatly augments the usefulness of the solid tire since when the pneumatic tire becomes useless the solid tire can be attached to the clencher rim of the wheel and the wheel will be rendered as useful as before and thus prevent the total destruction of the pneumatic tire. In this manner the outer tire is vertible into a complete tire for the wheel. In Fig. 5 is shown a solid rubber block G, a series of which can be used in place of a continuous solid rubber outer tire. This is provided with clencher rims F and nonskidding ridges I as in the continuous outer tire.

Having described the invention what I claim as new and desire to secure by Letters Patent is:

The combination of a wheel felly, an inner clencher rim thereon, a pneumatic tire on the rim, a metallic outer rim member on the said tire, having clencher edges, and a plurality of rubber tread members held on the outer rim by said edges, said members being of proper size to fit said inner clencher rim upon removal of the pneumatic tire.

In testimony whereof, I hereunto set my hand this 13th day of January, 1911.

ROBERT WRIGHT.

In presence of—
　W<small>M</small>. M. M<small>ONROE</small>,
　G<small>EO</small>. S. C<small>OLE</small>.

---

Copies of this patent may be obtained for five cents each, by addressing the "Commissioner of Patents, Washington, D. C."